(12) United States Patent
Kim et al.

(10) Patent No.: US 9,872,093 B2
(45) Date of Patent: Jan. 16, 2018

(54) AUDIO OUTPUT APPARATUS AND CONTROL METHOD THEREOF

(71) Applicant: SAMSUNG ELECTRONICS CO., LTD., Suwon-si (KR)

(72) Inventors: Ji-gwang Kim, Seoul (KR); Joon-soo Kim, Seoul (KR); Yu-li Sung, Goyang-si (KR); Young-soo Hong, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 14/970,705

(22) Filed: Dec. 16, 2015

(65) Prior Publication Data

US 2016/0189667 A1    Jun. 30, 2016

(30) Foreign Application Priority Data

Dec. 26, 2014 (KR) .......................... 10-2014-0190630

(51) Int. Cl.
*H04R 1/02* (2006.01)
*G06F 3/16* (2006.01)
*G10H 1/36* (2006.01)
*H04S 7/00* (2006.01)
*G09G 5/00* (2006.01)

(52) U.S. Cl.
CPC ............. *H04R 1/023* (2013.01); *G06F 3/165* (2013.01); *G10H 1/368* (2013.01); *H04S 7/00* (2013.01); *G09G 5/00* (2013.01); *G09G 2340/14* (2013.01); *G10H 2210/031* (2013.01); *G10H 2220/351* (2013.01); *G10H 2240/081* (2013.01); *G10H 2240/085* (2013.01); *H04S 2420/01* (2013.01)

(58) Field of Classification Search
CPC ................................................. G06F 17/30265
USPC ......................................................... 345/619
See application file for complete search history.

(56) References Cited

U.S. PATENT DOCUMENTS

| | | | | |
|---|---|---|---|---|
| 5,611,693 A * | 3/1997 | Chaya | .................... | G10H 1/363 348/571 |
| 5,889,223 A * | 3/1999 | Matsumoto | ............ | G10H 1/366 434/307 A |
| 5,982,980 A * | 11/1999 | Tada | ...................... | G10H 1/368 386/241 |
| 2002/0188399 A1* | 12/2002 | Odagawa | ........... | G01C 21/3461 701/533 |
| 2007/0292831 A1* | 12/2007 | Lee | ........................ | G10H 1/368 434/307 A |
| 2008/0306995 A1* | 12/2008 | Newell | ............. | G06F 17/30265 |
| 2013/0222271 A1* | 8/2013 | Alberth | ................... | G06F 1/163 345/173 |

* cited by examiner

*Primary Examiner* — Thomas Lett
(74) *Attorney, Agent, or Firm* — Sughrue Mion, PLLC

(57) ABSTRACT

An audio output apparatus a display configured to display an output image; a speaker configured to output audio; and a processor configured to control the speaker to output music content as the audio, determine, based on meta data and external environment information, an image category corresponding to the music content among presorted image categories, determine at least one image corresponding to the determined image category as a background image, and control the display to display the determined at least one image as the output image.

17 Claims, 12 Drawing Sheets

| DETAILED 31-1 | 31-2 | 31-3 | |
|---|---|---|---|
| CLASSIC | NEWAGE | PRENATAL EDUCATION | |
| ORCHESTRAL MUSIC | EASY LISTENING | TOGETHER WITH | |
| SYMPHONY | J-NEWAGE | MOTHER AND FATHER | |
| CHAMBER MUSIC | NEW AGE PIANO | CLASS FOR BABY | |
| CONCERTO | | | |
| SOLO | | RELAX AND HEALING | |
| OPERA | | | |
| CROSSOVER | | NATURE | |
| MODERN MUSIC | | - NATURAL MUSIC | |
| VOCAL MUSIC/CHORUS | | - ACOUSTIC MUSICAL INSTRUMENT | |
| BALLET/DANCE MUSIC | | - TRADITIONAL MUSIC | |

| 32-1 | 32-2 | 32-3 | 32-4 |
|---|---|---|---|
| JAZZ | R&B/SOUL | INDIE MUSIC | POPULAR SONG |
| ACID JAZZ | DOMESTIC | ACOUSTIC | BALADE |
| BOP | OVERSEAS | STYLE | R&B/SOUL |
| BOSSA NOVA | R&B | | |
| J-JAZZ | SOUL | | |
| LATIN JAZZ | URBAN | | |
| BIG BAND/SWING | | | |

URBAN
- MODERN MUSIC
- ACOUSTIC MUSICAL INSTRUMENT +
 ELECTRONIC MUSICAL INSTRUMENT

| ABSTRACT 33-1 | 33-2 | 33-3 | 33-4 | 33-5 |
|---|---|---|---|---|
| CHILDREN | RELIGIOUS MUSIC | KOREAN CLASSICAL MUSIC | CCM | OST |
| CHILDREN'S SONG WORLD | BUDDHIST MUSIC | KOREAN CLASSICAL MUSIC CROSSOVER | DOMESTIC CCM | DOMESTIC MOVIE |
| FAIRY-TALE WORLD | CATHOLIC MUSIC | KOREAN CLASSICAL | OVERSEAS CCM | OVERSEAS MOVIE |
| CARTOON PARTY | | MUSIC POPULAR SONG | WORSHIP | DOMESTIC DRAMA |
| ENGLISH VILLAGE | | FOLK SONG | HYMN | OVERSEAS DRAMA |
| CHILDREN'S CLASSIC | | | SACRED SONG | ANIMATION/GAME |
| | | | MUSICAL PROGRAM | DOMESTIC MUSICAL |

NATURE
- LOCALIZED MUSIC/WEAK BEAT
- MUSIC IN AMBIGUOUS CLASSIFICATION OF GENRE

| 34-1 | 34-2 | 34-3 | 34-4 | 34-5 |
|---|---|---|---|---|
| POP | JPOP | ROCK/METAL | ELECTRONICA/ CLUB MUSIC | TROT |
| POP | J-POP | DOMESTIC | DOMESTIC | NEW-GENERATION TROT |
| ROCK | J-ROCK | OVERSEAS | OVERSEAS | LEGENDARY TROT |
| ALTERNATIVE ROCK | ELECTRONICA | MODERN/ALTERNATIVE ROCK | ELECTRONICA | TROT |
| HARD ROCK | RAP/HIP HOP | POP METAL/HARD ROCK | CLUB MUSIC | TROT MEDLEY |
| HEAVY METAL | | ART ROCK | | |
| NEW METAL/HARD CORE 34-6 | | NEW METAL/HARD CORE | | |
| PROGRESSIVE | RAP/HIP HOP | WORLD MUSIC — 34-7 | | |
| ART ROCK | DOMESTIC | CHANSON | | |
| ELECTRONICA | OVERSEAS | CANZONE | | |
| CLUB MUSIC | POP RAP | CELTIC/IRISH | | |
| RAP/HIPHOP | GANGSTER | BRAZIL | | |
| FOLK | HARD CORE RAP | TANGO | | |
| COUNTRY | 90'S HIP HOP | LATIN | | |
| WORLD POP | | REGGAE | | |

URBAN
- STRONG MUSICAL GENRE
- QUICK MUSICAL GENRE
- ELECTRONIC MUSICAL INSTRUMENT

FIG. 7

| PRIMARY SORTING (GENRE1) | SECONDARY SORTING (GENRE2) | | TERTIARY SORTING (GENRE3) | | | | |
|---|---|---|---|---|---|---|---|
| 71 | 72 | | 73 | | | | |
| GENRE | | | | | | | |
| NATURE | DETAILED (GALLERY) | NATURAL ENVIRONMENT | DAY | 1 | a | b | c | d | e |
| | | | NIGHT | 6 | f | g | h | i | j |
| | ABSTRACT (EFFECTOR) | NATURAL VISUALIZER | | 2 | 3 | 4 | 5 | |
| | | | | 7 | 8 | | | |
| URBAN | DETAILED (GALLERY) | MODERN ENVIRONMENT | DAY | | k | l | m | n | o |
| | | | NIGHT | | p | q | r | s | t |
| | ABSTRACT (EFFECTOR) | MODERN VISUALIZER | | 9 | 10 | | | |
| | | | | 11 | 12 | | | |

AUDIO OUTPUT APPARATUS AND CONTROL METHOD THEREOF

CROSS-REFERENCE TO RELATED APPLICATION

This application claims priority from Korean Patent Application No. 10-2014-0190630, filed on Dec. 26, 2014, in the Korean Intellectual Property Office, the disclosure of which is incorporated herein by reference in its entirety.

BACKGROUND

Field

Apparatuses and methods consistent with exemplary embodiments relate to an audio output apparatus and a control method thereof, and more particularly, to an audio output apparatus and a control method thereof which provide a video which matches an atmosphere of music contents to a user with the music contents.

Description of Related Art

With the development of electronic technology, various types of audio output apparatuses have been developed.

In particular, in recent years an effort for developing the audio output apparatus in a newer type has been made in order to coincide with the needs of a user who desires newer and various functions. In recent years, as an interest in sensibility engineering increases, a research into human sensibility and development of products acquired by applying the research have been achieved. In particular, sensibility ICT convergence technology has come to the fore, which automatically recognizes the human sensibility and processes information according to a use situation and provides the processed information to the user and the technology can be applied even to the audio output apparatus. An emotion felt by the user may be further uplifted or vary depending on how music contents provided by the audio output apparatus are provided to suit the property of the music contents.

Meanwhile, an attempt to visually provide an audio to the user is made through technology that converts an audio into light and displays the light by making an amplitude and a wavelength of the audio to correspond to an amplitude and a wavelength of the light, such as a visualizer in the related art.

However, because the audio is visualized by considering only the amplitude and the wavelength of the audio in the related art and a visual effect depending on a detailed genre of reproduced music cannot be provided, it is inadequate in causing the user to feel advanced sensibility. Further, the related art has a problem in that a unidirectional service is provided without considering the user. For example, an emotion of the user depending on the detailed genre of the music, a difference between night and day, and weather is also changed and the related art cannot visually provide the change in sensibility. As a result, seeking a method that can provide images which match the genre of the provided music contents and an atmosphere of an external environment together while providing the music contents to the user is requested.

SUMMARY

Exemplary embodiments may overcome the above disadvantages and other disadvantages not described above. Also, exemplary embodiments are not required to overcome the disadvantages described above, and an exemplary embodiment may not overcome any of the problems described above.

An aspect of an exemplary embodiment relates to an audio output apparatus including: a speaker configured to output audio; a display configured to display an output image; and a processor configured to control the speaker to output music content as the audio, determine, based on meta data and external environment information, an image category corresponding to the music content among presorted image categories, determine at least one image corresponding to the determined image category as a background image, and control the display to display the determined at least one image as the output image.

The external environment information may include at least one from among time information, weather information, and location information.

The processor may be further configured to select the at least one image that belongs to the determined image category based on the meta data and the external environment information.

The processor may be further configured to, after a period of time, substitute the determined at least one image displayed as the background image with another image that belongs to the determined image category corresponding to the music contents and to control the display to display the determined another image.

The audio output apparatus may further include: a communicator configured to communicate with an external server. The processor may be further configured to extract feature information of the music content and retrieve the meta data corresponding to the music content from the external server based on the extracted feature information.

The audio output apparatus may further include: a cover provided on a front surface of the display. A weave density of the cover may be proportional to a grain of the display.

The cover may be implemented integrally with a speaker cover provided on the front surface of the speaker and covering the speaker.

The presorted image categories may be categorized based on a corresponding genre of the music content and each of the presorted image categories may include sub-categories based on corresponding external environment information.

The presorted image categories may include a first category corresponding to a natural image and a second category corresponding to a modern image, and each of the first category and the second category may include a first sub category corresponding to a daytime zone image and a second sub category corresponding to a night time zone image.

The presorted image categories may include at least one theme from among a nature theme, a city theme, a color illumination theme, a weather theme, and a visualizer theme.

According to an aspect of another exemplary embodiment, a method of controlling an audio output apparatus, includes: outputting music content; determining, based on meta data and external environment information an image category corresponding to the output music content among presorted image categories; determining at least one image corresponding to the determined image category as a background image, and control the display to display the determined at least one image as the output image; and displaying the determined at least one image.

The external environment information may include at least one from among time information, weather information, and location information.

The method may further include: selecting at least one image that belongs to the determined image category based on the meta data and the external environment information.

The method may further include: substituting, after a period of time, the determined at least one image displayed as the background image is substituted with another image that belongs to the determined image category corresponding to the music contents; and displaying the determined another image.

The method may further include: extracting feature information of the music content; and retrieving the meta data corresponding to the music content from an external server based on the extracted feature information.

The presorted image categories may be categorized based on a corresponding genre of the music content and each of the presorted image categories may include sub-categories based on corresponding external environment information.

The presorted image categories may include a first category corresponding to a natural image and a second category corresponding to a modern image, and each of the first category and the second category may include a first sub category corresponding to a day time zone image and a second sub category corresponding to a night time zone image.

The presorted image categories may include at least one from among a nature theme, a city theme, a color illumination theme, a weather theme, and a visualizer theme.

According to an aspect of yet another exemplary embodiment, a non-transitory storage medium contains program instructions for causing at least one processor to perform a method, the method including: outputting music content; determining, based on meta data and external environment information an image category corresponding to the output music content among presorted image categories; determining at least one image corresponding to the determined image category as a background image, and control the display to display the determined at least one image as the output image; and displaying the determined at least one image.

The presorted image categories may be categorized based on a corresponding genre of the music content and each of the presorted image categories may include sub-categories based on corresponding external environment information.

BRIEF DESCRIPTION OF THE DRAWINGS

The above and/or other aspects will be more apparent by describing certain exemplary embodiments with reference to the accompanying drawings, in which:

FIG. 2 is a diagram illustrating meta data granted to music contents according to an exemplary embodiment;

FIG. 3 is a diagram illustrating an image category in which a corresponding image is sorted based on the genre of the music contents according to an exemplary embodiment;

FIG. 7 is a diagram illustrating a method of sorting an image category based on the genre of the music contents and information on the external environment according to an exemplary embodiment;

DETAILED DESCRIPTION

Figure 1:
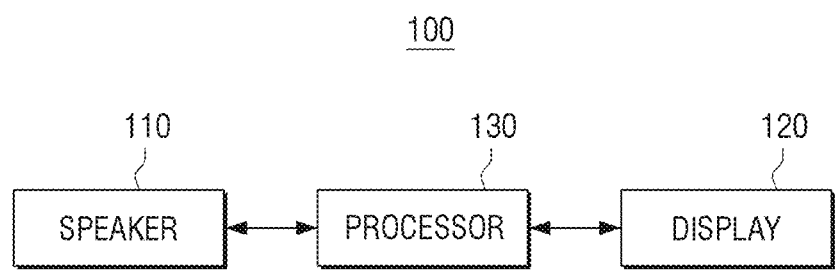
FIG. 1 is a block diagram schematically illustrating a configuration of an audio output apparatus according to an exemplary embodiment.

In the following description, same or similar drawing reference numerals are used for the similar elements, even in different drawings. The matters defined in the description, such as detailed construction and elements, are provided to assist in a comprehensive understanding. Thus, it is apparent that exemplary embodiments can be carried out without those specifically defined matters. Also, well-known functions or constructions may not be described in detail to avoid unnecessary detail. Expressions such as "at least one of," when preceding a list of elements, modify the entire list of elements and do not modify the individual elements of the list.

Hereinafter, exemplary embodiments will be described in detail with reference to the accompanying drawings.

FIG. 1 is a block diagram schematically illustrating a configuration of an audio output apparatus according to an exemplary embodiment.

According to FIG. 1, the audio output apparatus 100 according to an exemplary embodiment includes a speaker 110, a display 120, and a processor 130.

Speaker 110 is a component that outputs audio, such as reproduced music contents.

Herein, the speaker 110 may be coupled to the audio output apparatus 100, but is not limited thereto. That is, the speaker 110 may be implemented as a receiver, such as an external speaker 110 or an earphone that is connected to an audio output terminal of the audio output apparatus 100, to output the music contents reproduced by the audio output apparatus 100.

The display 120 is a component that displays an image. In particular, the display 120 may display a background image corresponding to the music contents reproduced according to a control of the processor 130. The display 120 may be implemented by a liquid crystal display panel (LCD), an organic light emitting diodes (OLEDs), or the like, but is not limited thereto. Further, the display 120 may include a driving circuit, a backlight unit, and the like, which may be implemented in various forms such as amorphous silicon (a-si) thin field transistor (TFT), low temperature poly silicon (LTPS) TFT, organic TFT (OTFT), and the like.

The processor 130 controls an overall operation of the audio output apparatus 100.

In particular, the processor 130 may control display 120 to display, as the background image, one or more images that belong to an image category, among presorted image categories, corresponding to the music contents. The image category being determined based on meta data of the music contents and information on an external environment.

Herein, the meta data means data for indexing contents so as to retrieve the contents of specific music contents. For example, in the case of music contents having an MPEG layer 3 (MP3) audio file format, a standardized ID3 tag may be used as the meta data and tag information including a singer, a title, a year, an album, a genre, and the like. The ID3 tag may be included in the music contents.

Meanwhile, when the music contents do not include the meta data, feature information of the music contents may be extracted, the music contents may be retrieved from an external server based on the extracted feature information, and the meta data corresponding to the retrieved music contents may be received. Herein, the feature information may be an audio fingerprint of the music contents and the music contents may be retrieved by comparing the feature information.

Meanwhile, information on an external environment means information on a music listening environment of a user who listens to the music contents through the audio output apparatus 100 in addition to information related with reproduced music contents.

The information on the external environment may include time information on a time when the music contents are reproduced. For example, the information on the external environment may include information indicating whether the music contents are reproduced in the daytime of one day, whether the music contents are reproduced at night, whether the music contents are reproduced in a time zone set by the user during one day, or what season the music contents are reproduced in.

Further, the information on the external environment may include weather information on the time when the music contents are reproduced. For example, information indicating whether the music contents are reproduced in sunny weather or whether the music contents are reproduced it is raining may also be considered be included in the information on the external environment. The weather information is received from an external server through the Internet, and the like to be reflected in real time.

Meanwhile, the information on the external environment may also include information on a place where the audio output apparatus is positioned. Information indicating whether the music contents are reproduced indoors or outdoors may also be included and may be used in selecting a background image to be displayed.

The audio output apparatus 100 may indirectly recognize a music listening environment of the user through the information on the external environment, and the music listening environment of the user is reflected to display the background image which matches the reflected music listening environment.

An image category corresponds to the meta data of the music contents. For example, information in which images matching the genre of the music contents may be mapped and sorted according to the genre of the music contents, and the like. For example, in the case of strong and up-tempo rock music, images having a dark and urban feel may be mapped, and in the case of a quiet and slow tempo classical (ballad) music, images having a bright and natural feel may be mapped. The image category may be presorted and stored in the audio output apparatus 100 and stored in the external server connected through a communication unit (not illustrated).

Meanwhile, the images mapped through the image category may be image contents that are presorted and stored in the audio output apparatus 100, or image contents stored by a user. Sorting the image contents according to the metadata of the music contents may be manually performed by the user, but the audio output apparatus 100 may automatically perform the sorting. In detail, the audio output apparatus 100 analyzes features of the image, such as a frame change, luminance, and the like of the image to sort the image contents. For example, by considering whether the frame change of the image is rapid, whether the luminance is high, or whether it is dark, the image category may be sorted so as to map the music contents having a genre matching therewith.

In this case, the image may be provided according to at least one theme of a nature theme, a city theme, a color illumination theme, a weather theme, and a visualizer theme. The nature theme may include an image having a natural feel and the city theme may include an image having an urban feel, for example, a panorama of a city. Further, the color illumination theme may include images having various colors, which may serve as an illumination, and the weather theme may include an image that reflects current weather in real time, to allow the user to directly/indirectly know the current weather.

As a result, the processor 130 may control one or a plurality of images among the images that belong to the image category corresponding to the music contents, to be displayed as the background image.

Meanwhile, a process of determining the image category and selecting the background image is performed through the external server to be implemented in a method that receives a result of performing the process. However, the processor 130 may also control determining of the image category corresponding to the music contents and one or a plurality of background images that belong to the determined image category to be selected and displayed, based on the metadata of the music contents and the information on the external environment.

In this case, the processor 130 may select the image category corresponding to the music contents among the presorted image categories and select at least one image that belongs to the selected image category as a background image to be provided as feedback for the music contents, based on the metadata of the music contents and the information on the external environment.

Further, the processor 130 may determine the image category corresponding to the music contents based on the meta data of the music contents and provide at least one image that belongs to the determined image category as the feedback and display the provided image based on the information on the external environment. That is, in the case of the presorted image categories, an upper category may be sorted based on the metadata of the music contents, and a lower category may be sorted based on the information on the external environment. Herein, the meta data may consider only the genre.

In this case, the upper category may be sorted into a first category that matches a natural image and a second category that matches a modern image based on the genre of the music contents. Further, the lower category may be sorted into a first sub category that matches an image in a daytime zone and a second sub category that matches a night time zone image.

For example, music contents having an R&B genre may be sorted into the second category that matches the modern image. In this case, the second category as the city theme may include images containing the panorama of the city. Further, as the information on the external environment, time information on the time when the music contents are reproduced is used and when a time zone in which the music contents are reproduced at present is the night time zone, the time information is sorted into the second sub category that matches a night time zone image to display an image containing the panorama of the city in the night time zone.

As described above, the processor 130 may substitute and display an image to be displayed as the background image with another image that belongs to the image category corresponding to the music contents according to a change of time.

Figure 2:
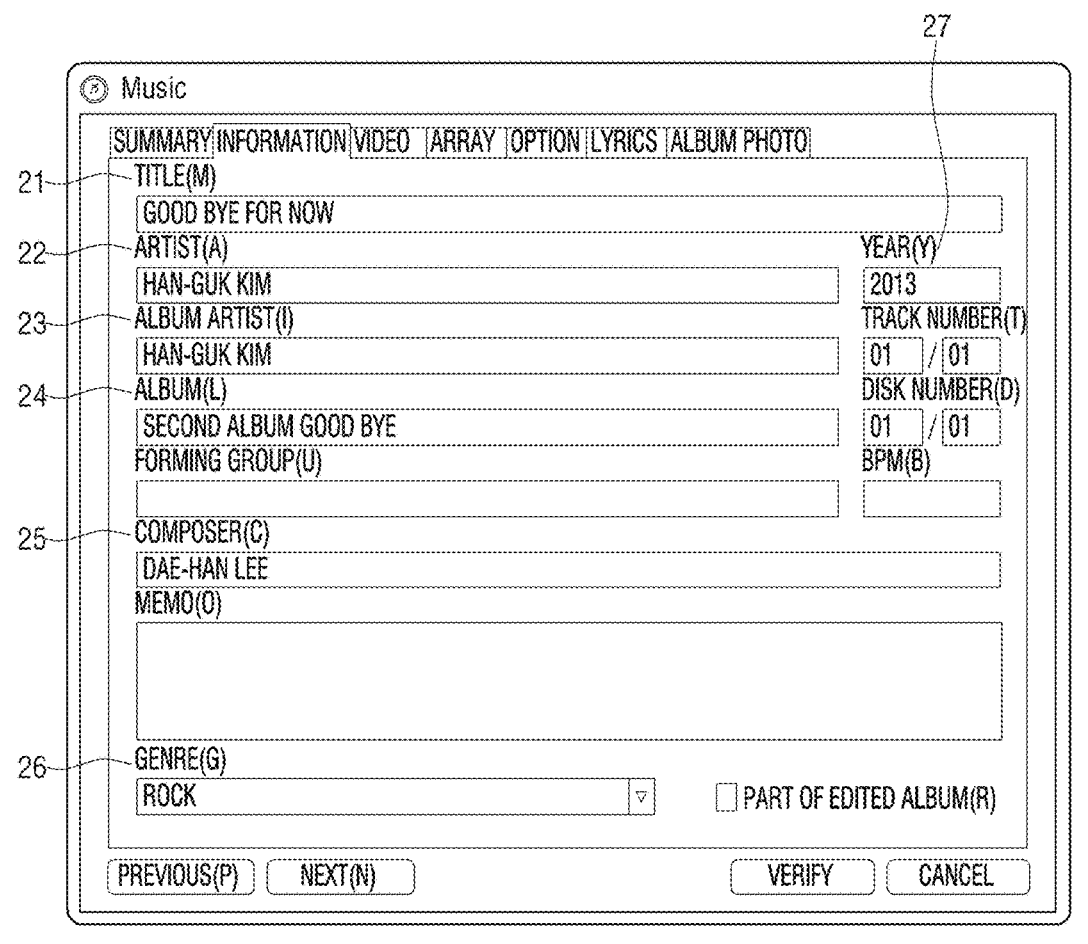

FIG. 2 is a diagram illustrating meta data corresponding to music contents according to an exemplary embodiment.

As illustrated in FIG. 2, the meta data may include information such as a song title 21, an artist 22, an album artist 23, an album title 24, a composer 25 a genre 26, and a release year 27.

In the case of the MP3 audio file format, an ID3 tag standard format may be used as the meta data and a tag having a fixed size, which is attached to a header of an MP3 file, may include the information such as the song title, the artist, the genre, and the like therein.

FIG. 3 is a diagram illustrating an image category in which a corresponding image is sorted based on the genre of the music contents according to an exemplary embodiment.

The music contents may be sorted into various genres including classic, jazz, rock/metal, and the like. Herein, each genre may have a wide meaning, such as sorting a plurality of music modes which give the same or similar feeling according to a specific criterion, in addition to a meaning of a mode of the music according to a composition method.

As illustrated in FIG. 3, the image categories may be generally sorted into an image category to which the music contents having the natural genre correspond and an image category to which the music contents having the modern genre correspond.

The music contents having the natural genre may include classic 31-1, new age 31-2, prenatal education 31-3, children 33-1, religious 33-2, Korean traditional 33-3, contemporary Christian (CCM) 33-4, and open source track (OST) 33-5.

The music contents having the natural genre may be resorted into a detailed music genre and an abstract music genre. As illustrated in FIG. 3, the classic 31-1, the new age 31-2, and the prenatal music 31-3 as genres which correspond to music played by an acoustic instrument or traditional music, may be sorted into the detailed music genre that gives a placid and detailed feeling. Contrary to this, the children music 33-1, the religious music 33-2, the Korean traditional music 33-3, the CCM 33-4, and the OST 33-5 as the genres which correspond to localized weak-tempo music having a local color or music of which genre sorting is indefinite, may be sorted into the abstract music genre that gives an abstract feeling.

Meanwhile, the music contents having the modern genre may include jazz 32-1, R&B/soul 32-2, indie music 32-3, a popular song 32-4, pop 34-1, jpop 34-2, rock/metal 34-3, electronica/club music 34-4, trot 34-5, rap/hip-hop 34-6, and world music 34-7.

The music contents having the modern genre may be resorted into the detailed music genre and the abstract music genre similarly to the natural genre. As illustrated in FIG. 3, jazz 32-1, the R&B/soul 32-2, the indie music 32-3, the popular song 32-4 as genres which correspond to music played by the acoustic instrument or an electronic instrument, may be sorted into the detailed music genre that gives an urban and refined feeling. Contrary to this, pop 34-1, jpop 34-2, the rock/metal 34-3, the electronica/club music 34-4, the trot 34-5, the rap/hip-hop 34-6, and the world music 34-7 as genres which correspond to music played with a quick tempo by using an electronic instrument, may be sorted into the abstract music genre that gives a quick and strong feeling.

Figure 4:
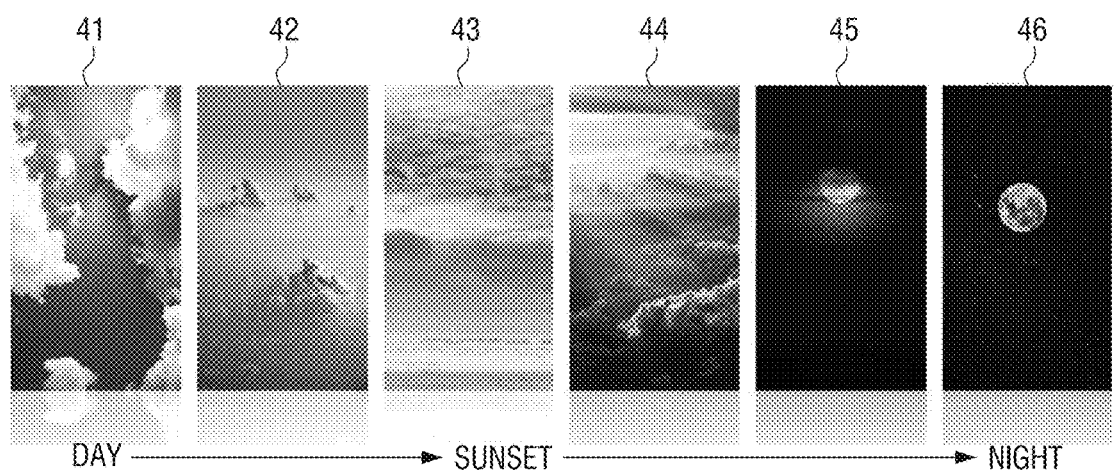
FIGS. 4 to 6 are diagrams illustrating a method of substituting and displaying a background image depending on a change in external environment according to diverse exemplary embodiments.
Figure 5:
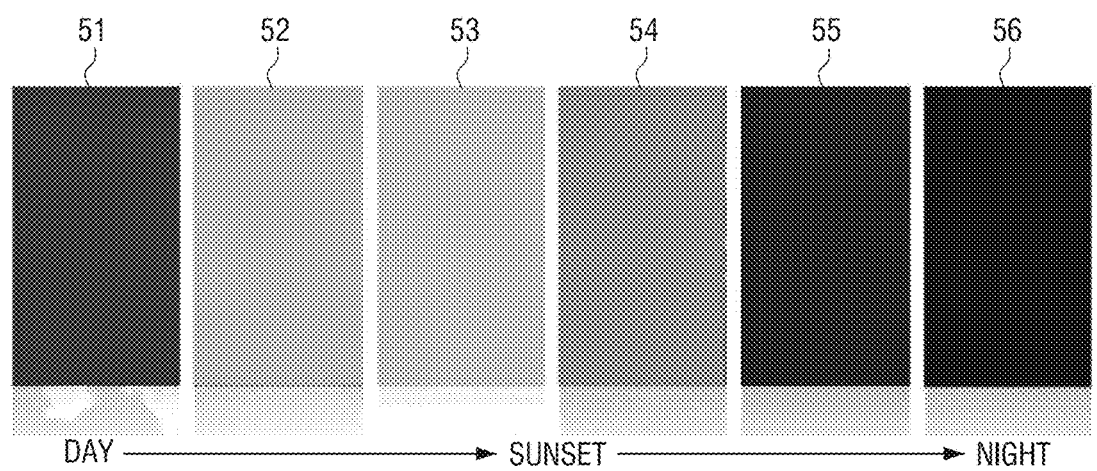
Figure 6:
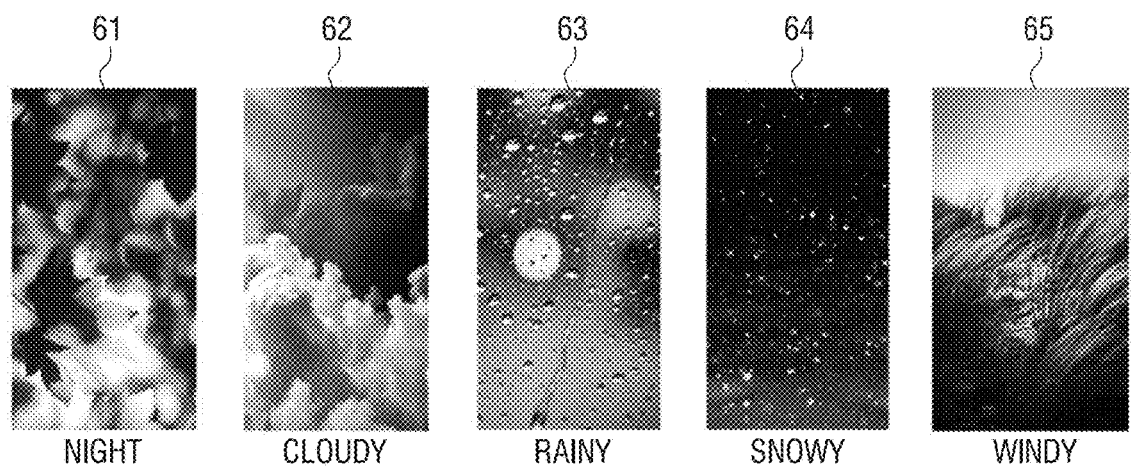

FIGS. 4 to 6 are diagrams illustrating a method of substituting and displaying a background image depending on a change in an external environment according to exemplary embodiments.

FIG. 4 is a diagram illustrating a method of substituting and displaying the background image according to a change of time according to an exemplary embodiment. As illustrated in FIG. 4, one day is divided into six time zones according to a predetermined criterion. In this case, the background images, which are displayed in respective time zones, may be differently displayed.

For example, in the case where the genre of the reproduced contents belongs to the natural music genre and in detail, belongs to the detailed music genre, the corresponding image contains the sky. Because the sun is rising from 6 a.m. to 10 a.m., images 41 and 42 of the sky, in which the sun rises, may be displayed. Because the sun is high in the sky from 10 a.m. to 2 p.m., images 43 and 44 of the sky, in which the sun is high up, may be displayed. Because the sun sets and the sky darkens from 2 p.m. to 6 a.m., an image, in which the sun sets, or images 45 and 46 of the dark sky, in which there is the moon, may be displayed.

FIG. 5 is a diagram illustrating a method of displaying the background image according to a change of time according to another exemplary embodiment. As illustrated in FIG. 5, one day is divided according to predetermined criterion into six time zones. In this case, illuminations having different colors may be displayed, so as to create an appropriate atmosphere according to each time zone.

Because the sun is rising from 6 a.m. to 10 a.m., and as a result, the sky is brightened, an illumination color of a blue color 51 or a light blue color 52 may be displayed. Because the sun is high in the sky from 10 a.m. to 2 p.m., an illumination color of a light blue color 53 or an orange color 54 may be displayed. Because the sun sets and the sky darkens from 2 p.m. to 6 a.m., an illumination color of a wine color 55 or a navy blue color 56 may be displayed.

FIG. 6 is a diagram illustrating a method of displaying the background image according to a weather change, according to another exemplary embodiment. As illustrated in FIG. 6, depending on the weather various images may be displayed while music contents are reproduced. These images may include, an image 61 corresponding to sunny weather, an image 62 corresponding to cloudy weather, an image 63 corresponding to rainy weather, an image 64 corresponding to snowy weather, and an image 65 corresponding to windy weather may be displayed.

As described above, a background image that belongs to a theme determined according to the genre of the music contents, may be variously substituted and displayed according to the change of time, to enhance a user listening experience.

FIG. 7 is a diagram illustrating a method of categorizing an image based on the genre of the music contents and information on the external environment, according to an exemplary embodiment.

As illustrated in FIG. 7, in the case of the image categories, the upper category is sorted based on the genre of the music contents and the lower category is sorted based on the information on the external environment.

In a method of sorting the upper category based on the genre of the music contents, corresponding image information is first primarily sorted (71) according to whether the music contents are the music contents having the natural genre which matches a natural image, or whether the music contents are the music contents having the modern genre which matches a modern image. When the music contents are sorted into the natural genre or the modern genre, the corresponding image information is secondarily (72) sorted according to whether the music contents are the detailed genre music which matches a detailed image (Gallery) containing an actual object or panorama, or whether the music contents are the abstract genre music which matches the abstract image (effector) such as a software graphic.

In this case, in the natural music genre, the music contents that belong to the detailed music genre may correspond to images of a forest, sea, river, sky, and the like, which contain the face of nature. Further, in the natural music genre, the music contents that belong to the abstract music genre may correspond to a natural visualizer image of light in which is blurred, is low contrast, or is soft or dark.

Meanwhile, in the modern music genre, the music contents that belong to the detailed music genre may correspond to images of a city, walls, a shadow, a window, and the like, which are urban and modern. Further, in the modern music genre, the music contents that belong to the abstract music genre may correspond to the modern visualizer image which has high contrast or has a vivid and clean feeling.

In addition, in a method of sorting the lower category based on the information on the external environment, for example, information on the image which matches the daytime zone image and the image which matches the night time zone is tertiarily sorted (73). Accordingly, the image which matches each time zone may be determined according to whether it is the daytime zone or the night time zone.

Figure 8:
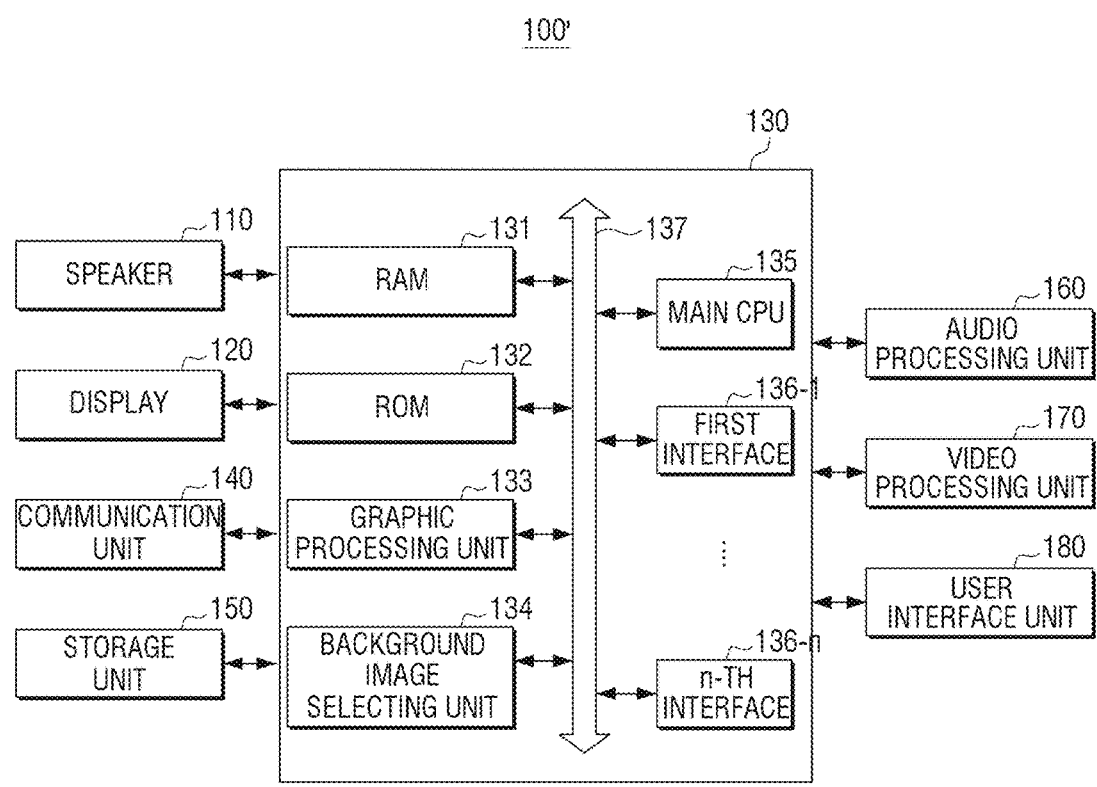
FIG. 8 is a block diagram illustrating, in detail, a configuration of an audio output apparatus according to another exemplary embodiment.

FIG. 8 is a block diagram illustrating, in detail, a configuration of an audio output apparatus according to another exemplary embodiment. As illustrated in FIG. 8, the audio output apparatus 100' includes a speaker 110, a display 120, a processor 130, a communication unit 140, a storage unit 150, an audio processing unit 160, a video processing unit 170, and a user interface unit 180. Hereinafter, a description of the components duplicated with the description in FIG. 1 will be omitted.

The communication unit 140 communicates with an external apparatus according to various types of communication modes.

In particular, the communication unit 140 may communicate with various servers, including an social networking service (SNS) server. Herein, the communication unit 140 may include various communication chips including, for example, a Wi-Fi chip, a Bluetooth chip, a wireless communication chip, a near-field communication (NFC) chip, and the like. As a result, the communication unit 140 may, for example, request and receive meta data corresponding to the music contents, the background image to be displayed, information on the external environment, such as the weather, a temperature, and the like, from an external server or an external terminal. In this case, the communication unit 140 may communicate with a plurality of external servers such as a service provider providing the music contents or a portal providing the information on the external environment.

The storage unit 150 is a component that stores various data required for an operation of the audio output apparatus 100'.

In particular, the storage unit 150 may store the music contents and a database regarding the background image and image category information. Further, the storage unit 150 may store programs and data for determining the genre of the music contents and selecting the background image corresponding to the music contents according to the pre-sorted image category.

In addition, the storage unit 150 may store various programs and data for controlling overall operation of the audio output apparatus 100' and may temporarily store data generated during operation. In particular, the storage unit 150 may store various modules for driving the audio output apparatus 100'. The storage unit 150 may store software including various modules including a base module, a communication module, a service module, a genre determination module, and a background image selection module.

The base module means a basis module that processes a signal transferred from each hardware component included in the audio output apparatus 100' and transfers the processed signal to an upper layer module. The base module may include a storage module, a security module, and a network module. The storage module is a program module that manages the database (DB) or a registry. The security module is a program module that supports certification of the hardware, request permission, secure storage, and the like and the network module as a module for supporting network connection includes a DNET module, a universal plug and play (UPnP) module, and the like.

The communication module is a module for communicating with the outside. The communication module may include a messaging module and a telephone module.

The service modules include various applications for providing various services.

The genre determination module may determine the genre by extracting the meta data of the music contents. Further, the genre determination module analyzes a frequency and a frequency distribution of the music contents to determine the music genre according to a predetermined criterion and determine the music genre by generally considering the singer, the song title, the album release year, and the like, of the music contents. For example, in the case of a singer who sings only ballade songs, it may be predicted that all of the songs which the singer sings will be of the ballade genre. Further, the natural music genre or the modern music genre may be sorted according to analysis of words used in the song title or the album release year.

The background image selection module may select the background image that matches the currently reproduced music contents based on the genre of the music contents and the information on the external environment. In particular, the processor 130 may, in real time, substitute the currently displayed background image with another image that belongs to the image category corresponding to the reproduced music contents and to the external environment by using the background image selection module.

Herein, the storage unit 150 may be implemented as various storage devices including a flash memory, a hard disk, and the like.

The processor 130 controls the overall operation of the audio output apparatus 100' by using various modules stored in the storage unit 150.

The processor 130 includes a random-access memory (RAM) 131, a read-only memory (ROM) 132, a graphic processing unit 133, a background image selection unit 134, a main CPU 135, first to n-th interfaces 136-1 to 136-n, and a bus 137. In this case, the RAM 131, the ROM 132, the graphic processing unit 133, the background image selection unit 134, the main CPU 135, the first to n-th interfaces 136-1 to 136-n, and the like may be connected to one other through the bus 137.

The ROM 132 stores a command set for system booting, and the like. The main CPU 135 copies various application programs stored in the storage unit 150 to the RAM 131 and executes the application programs copied to the RAM 131 to perform various operations.

The graphic processing unit 133 generates a screen including various objects including icons, images, texts, and the like by using a calculation unit and a rendering unit. A calculation unit calculates attribute values including coordinate values, shapes, sizes, colors, and the like, by which the respective objects are to be displayed according to a layout of the screen. A rendering unit generates screens having various layouts, including the objects based on the attribute values calculated in the calculation unit.

The background image selection unit 134 selects the background image to be displayed. The background image selection unit 134 may determine the genre by extracting the meta data of the music contents by using various modules stored in the storage unit 150, and select the background image that matches the music contents which are currently reproduced based on the determined genre of the music contents and the information on the external environment.

The main CPU 135 accesses the storage unit 150 to boot using an operating system (O/S) stored in the storage unit 150. In addition, the main CPU 135 performs various operations by using various programs, contents, data, and the like, which are stored in the storage unit 150.

The first to n-th interfaces 136-1 to 136-n are connected with various components, as described above. One of the interfaces may be a network interface connected with an external apparatus through a network.

The audio processing unit 160 is a component that processes audio data. The audio processing unit 160 may perform various processing, such as decoding, amplification, or noise-filtering, of the audio data.

The video processing unit 170 is a component that processes the background image to be displayed by the display 120. The video processing unit 170 may perform various image processing such as decoding, scaling, noise-filtering, frame rate conversion, resolution conversion, and the like of the background image.

The user interface unit 180 is a component for sensing user interactions, which may be used for controlling the overall operation of the audio output apparatus 100'. In particular, the user interface unit 180 may include various interaction sensing devices such as a remote controller signal receiver. The remote controller signal receiver is a component for transmitting general control signals (power, channel change, and volume change, and the like) for controlling the audio output apparatus 100'.

Figure 9A:
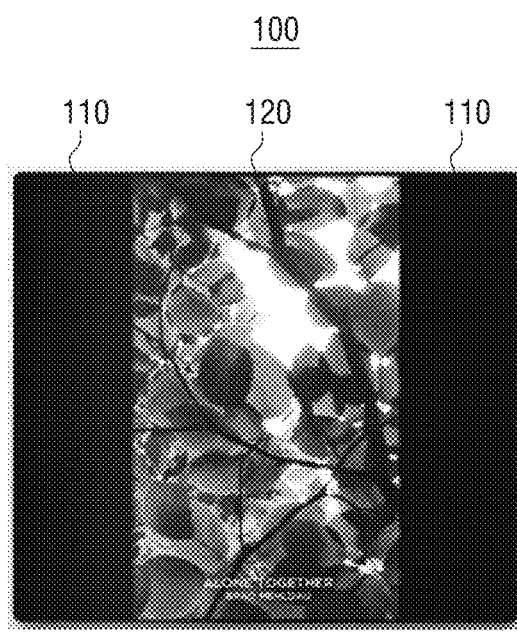
FIGS. 9A and 9B are diagrams illustrating a state in which the audio output apparatus displays a background image according to an exemplary embodiment.
Figure 9B:
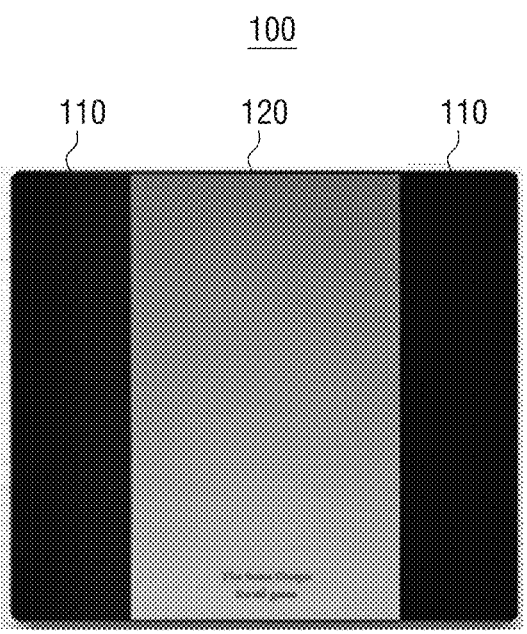

FIGS. 9A and 9B are diagrams illustrating a state in which the audio output apparatus displays the background image according to an exemplary embodiment.

As illustrated in FIGS. 9A and 9B, the audio output apparatus 100 may be implemented in a form in which the speakers 110 are arranged on both sides of the display 120. However, the form of the audio output apparatus 100 is not limited thereto, and the speaker 110 may be arranged only on one side of the display 120 and the audio output apparatus 100 may be implemented in all forms including the display 120 and the speaker 110.

The audio output apparatus 100 of FIG. 9A displays a photographed image which matches the reproduced music contents. When the reproduced music contents are sorted into the detailed music genre, a photographed image or a picture may be displayed.

The user may store an image photographed in the audio output apparatus 100 by capturing the image and setting the genre. However, without the user setting the genre, the audio output apparatus 100 analyzes features of the image, such as a frame change, luminance, and the like, of the image to sort the image contents. Further, the audio output apparatus 100 may download a photograph or image uploaded to the external server to display the downloaded photograph or image by a user.

The audio output apparatus 100 of FIG. 9B displays a visualizer which matches the reproduced music contents. When the reproduced music contents are sorted into the abstract music genre, the software graphic without substance may be displayed.

Figure 10:
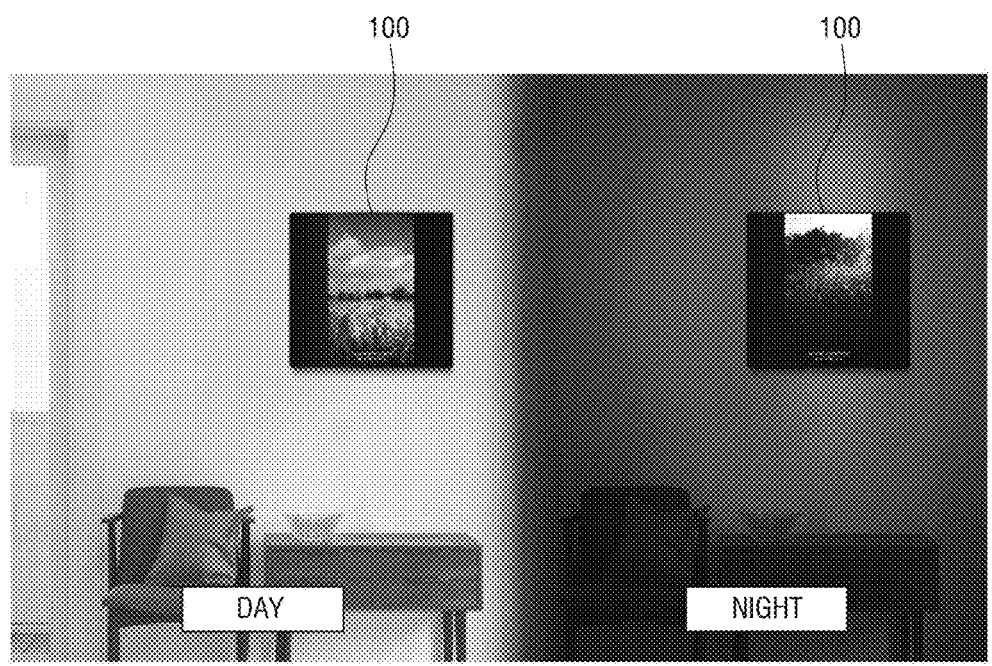
FIG. 10 is a diagram illustrating a state in which the audio output apparatus displays different background images in accordance with day and night according to an exemplary embodiment.

FIG. 10 is a diagram illustrating a state in which the audio output apparatus displays different background images in accordance with day and night according to an exemplary embodiment.

As illustrated in FIG. 10, based on the genre of the music contents, the image category (the nature theme, the city theme, the color illumination theme, the visualizer theme, and the like) is determined. In the daytime zone, in which the illumination is bright by sunshine, an image which matches such an atmosphere is displayed in the determined image category. In the night time zone without sunshine, an image which matches a dark atmosphere is displayed to further promote the sensibility of the user who hears the music.

That is, the audio output apparatus 100, according to an exemplary embodiment substitutes the background image with another image that belongs to the same image category according to the change of time to display the corresponding image. The change of time may include a change from the daytime zone to the night time zone during one day, and widely includes a date change, a seasonal change, and the like.

Figure 11:
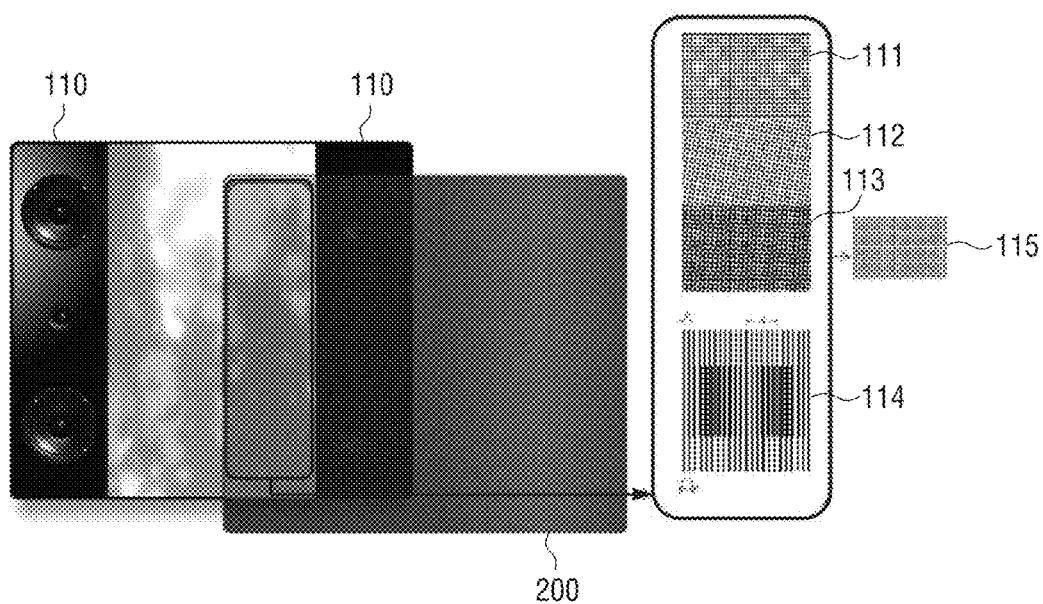
FIG. 11 is a diagram illustrating a cover having a Moire phenomenon preventing function according to an exemplary embodiment.

FIG. 11 is a diagram illustrating a cover having a Moire phenomenon preventing function according to an exemplary embodiment.

As illustrated in FIG. 11, the audio output apparatus 100 according to an exemplary embodiment may include a cover 200 covering the speaker 110 to protect the speaker 110. Further, the audio output apparatus 100 may include a cover 200 that is provided on a front surface of a display panel to cover the display panel, and in this case, the cover 200, as a screen dedicated fabric cover, may assist creating a sensitive image. As illustrated in FIG. 11, the cover covering the display panel may be implemented integrally with the cover covering the speaker.

In this case, the grain (density) of a fiber is proportional to a pixel grain of a produced screen to prevent a Moire phenomenon. The Moire phenomenon results in a pattern generated by an interference phenomenon caused by patterns having a predetermined interval repeatedly overlapping with each other. Accordingly, the grain of the produced screen is calculated, and a weaving density of the screen dedicated fabric cover is designed to be proportional to the calculated screen grain, to prevent the Moire phenomenon.

Figure 12:
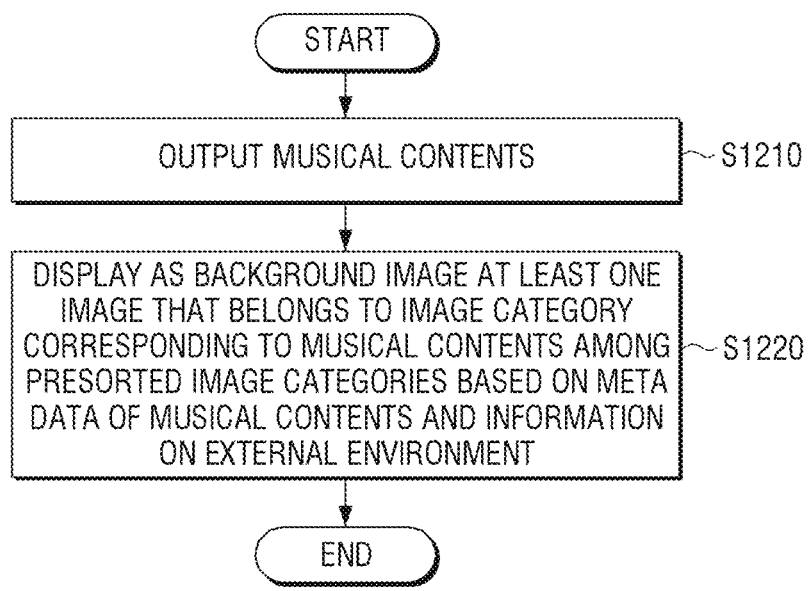
FIG. 12 is a flowchart illustrating a control method of an audio output apparatus according to an exemplary embodiment.

FIG. 12 is a flowchart for describing a control method of an audio output apparatus according to an exemplary embodiment.

First, the music contents are output (S1210). In this case, at least one image that belongs to the image category corresponding to the music contents, among the presorted image categories, may be displayed as the background image. The background image may be selected based on the meta data of the music contents and the information on the external environment (S1220). In this case, the information on the external environment may include at least one of time information regarding the time when the music contents are reproduced, weather information regarding the time when the music contents are reproduced, and information on a place at which the audio output apparatus 100 is positioned. In this case, in the displaying, the image category corresponding to the music contents is determined based on the meta data of the music contents, and at least one image that belongs to the determined image category is selected as the background image based on the information on the external environment to display the selected image. In this case, the image categories of the upper category may be sorted based on the genre of the music contents, and the lower category may be sorted based on the information on the external environment.

As described above, according to diverse exemplary embodiments, because images can be provided which match the genre of provided music contents and an atmosphere of an external environment, an advanced sensibility music listening experience can be implemented.

The control method of the audio output apparatus according to the diverse exemplary embodiments described above, may be implemented by a program that is stored in various recording media. That is, a computer program, which is processed by one or more various processors to execute the aforementioned various photographing methods, may be used while being stored in the recording medium.

As one example, a non-transitory computer readable medium may be provided, which stores a program for performing the outputting of the music contents and the displaying of at least one image that belongs to the image category corresponding to the music contents, among the presorted image categories, as the background image based on meta data of the music contents, and information on the external environment.

The non-transitory computer readable medium does not mean a medium that stores data for a short moment, such as a register, a cache, or the like, but rather a medium that semipermanently stores data and is readable by an apparatus. In detail, various applications or programs as described above may be provided while being stored in the non-transitory computer readable medium such as a compact disc (CD), a digital video disc (DVD), a hard disk, a Blu-ray disk, a universal serial bus (USB), a memory card, a ROM, or the like.

The foregoing exemplary embodiments and advantages are merely exemplary, and are not to be construed as limiting the present disclosure. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. An audio output apparatus comprising:
a speaker configured to output audio;
a display configured to display an output image; and
a processor configured to control the speaker to output music content as the audio, determine, based on meta data and external environment information, an image category corresponding to the music content among presorted image categories, determine at least one image corresponding to the determined image category as a background image, and control the display to display the determined at least one image as the output image,
wherein the presorted image categories are categorized based on a corresponding genre of the music content and each of the presorted image categories comprise sub-categories based on corresponding external environment information.

2. The audio output apparatus as claimed in claim 1, wherein the external environment information comprises at least one from among time information, weather information, and location information.

3. The audio output apparatus as claimed in claim 1, wherein the processor is further configured to select the at least one image that belongs to the determined image category based on the meta data and the external environment information.

4. The audio output apparatus as claimed in claim 1, wherein the processor is further configured to, after a period of time, substitute the determined at least one image displayed as the background image with another image that belongs to the determined image category corresponding to the music contents and to control the display to display the determined another image.

5. The audio output apparatus as claimed in claim 1, further comprising:
a communicator configured to communicate with an external server,
wherein the processor is further configured to extract feature information of the music content and retrieve the meta data corresponding to the music content from the external server based on the extracted feature information.

6. The audio output apparatus as claimed in claim 1, further comprising:
a cover provided on a front surface of the display,
wherein a weave density of the cover is proportional to a grain of the display.

7. The audio output apparatus as claimed in claim 6, wherein the cover is implemented integrally with a speaker cover provided on the front surface of the speaker and covering the speaker.

8. The audio output apparatus as claimed in claim 1, wherein:
the presorted image categories include a first category corresponding to a natural image and a second category corresponding to a modern image, and
each of the first category and the second category include a first sub category corresponding to a daytime zone image and a second sub category corresponding to a night time zone image.

9. The audio output apparatus as claimed in claim 1, wherein the presorted image categories include at least one theme from among a nature theme, a city theme, a color illumination theme, a weather theme, and a visualizer theme.

10. A method of controlling an audio output apparatus, the method comprising:
outputting music content;
determining, based on meta data and external environment information an image category corresponding to the output music content among presorted image categories;
determining at least one image corresponding to the determined image category as a background image; and
displaying the determined at least one image,
wherein the presorted image categories are categorized based on a corresponding genre of the music content and each of the presorted image categories comprise sub-categories based on corresponding external environment information.

11. The method as claimed in claim 10, wherein the external environment information comprises at least one from among time information, weather information, and location information.

12. The method as claimed in claim 10, further comprising:
selecting at least one image that belongs to the determined image category based on the meta data and the external environment information.

13. The method as claimed in claim 10, further comprising:
substituting, after a period of time, the determined at least one image displayed as the background image is substituted with another image that belongs to the determined image category corresponding to the music contents; and
displaying the determined another image.

14. The method as claimed in claim 10, further comprising:
extracting feature information of the music content; and
retrieving the meta data corresponding to the music content from an external server based on the extracted feature information.

15. The method as claimed in claim 10, wherein the presorted image categories include a first category corresponding to a natural image and a second category corresponding to a modern image, and each of the first category and the second category include a first sub category corresponding to a day time zone image and a second sub category corresponding to a night time zone image.

16. The method as claimed in claim 10, wherein presorted image categories include at least one from among a nature theme, a city theme, a color illumination theme, a weather theme, and a visualizer theme.

17. A non-transitory storage medium containing program instructions for causing at least one processor to perform a method, the method comprising:
outputting music content;
determining, based on meta data and external environment information an image category corresponding to the output music content among presorted image categories;
determining at least one image corresponding to the determined image category as a background image; and
displaying the determined at least one image,
wherein the presorted image categories are categorized based on a corresponding genre of the music content and each of the presorted image categories comprise sub-categories based on corresponding external environment information.

* * * * *